US011933269B2

(12) United States Patent
Caers

(10) Patent No.: US 11,933,269 B2
(45) Date of Patent: Mar. 19, 2024

(54) TORSION ABSORBER FOR WIND TURBINES

(71) Applicants: ZF Friedrichshafen AG, Friedrichshafen (DE); ZF Wind Power Antwerpen N.V., Lommel (BE)

(72) Inventor: Bart Caers, Dessel (BE)

(73) Assignees: ZF FRIEDRICHSHAFEN AG, Friedrichshafen (DE); ZF WIND POWER ANTWERPEN N.V., Lommel (BE)

(*) Notice: Subject to any disclaimer, the term of this patent is extended or adjusted under 35 U.S.C. 154(b) by 458 days.

(21) Appl. No.: 17/290,781

(22) PCT Filed: Oct. 7, 2019

(86) PCT No.: PCT/EP2019/077020
§ 371 (c)(1),
(2) Date: May 3, 2021

(87) PCT Pub. No.: WO2020/094308
PCT Pub. Date: May 14, 2020

(65) Prior Publication Data
US 2021/0388819 A1  Dec. 16, 2021

(30) Foreign Application Priority Data
Nov. 5, 2018  (DE) .................. 10 2018 218 812.2

(51) Int. Cl.
*F03D 15/00* (2016.01)
*F16F 15/14* (2006.01)

(52) U.S. Cl.
CPC .......... *F03D 15/00* (2016.05); *F16F 15/1435* (2013.01); *F05B 2260/964* (2013.01); *F16F 2222/08* (2013.01); *F16F 2230/0005* (2013.01); *F16F 2232/02* (2013.01); *F16F 2234/02* (2013.01); *F16F 2236/085* (2013.01)

(58) Field of Classification Search
CPC ... F03D 15/00; F16F 15/1435; F16F 2222/08; F16F 2230/0005; F16F 2232/02; F16F 2234/02; F16F 2236/085; F05B 2260/964
USPC ........................... 464/160; 24/280, 282, 284
See application file for complete search history.

(56) References Cited

U.S. PATENT DOCUMENTS

| | | | |
|---|---|---|---|
| 1,008,379 A * | 11/1911 | Sneeringer | F16D 3/72 464/160 |
| 2,878,689 A | 3/1959 | Aebersold et al. | |
| 3,204,665 A * | 9/1965 | Faint | F16L 55/172 24/279 |
| 4,196,786 A | 4/1980 | Beeskow et al. | |
| 5,971,859 A | 10/1999 | Runge et al. | |

(Continued)

FOREIGN PATENT DOCUMENTS

| | | |
|---|---|---|
| CN | 101508310 A | 8/2009 |
| CN | 102282617 A | 12/2011 |

(Continued)

*Primary Examiner* — Greg Binda
(74) *Attorney, Agent, or Firm* — LEYDIG, VOIT & MAYER, LTD.

(57) ABSTRACT

A torsion absorber is provided for attachment to a cylindrical section of a shaft. The torsion absorber includes a flywheel and at least one tensioner. The at least one tensioner is configured to brace a first segment and a second segment of the flywheel against the cylindrical section of the shaft.

15 Claims, 1 Drawing Sheet

(56) References Cited

U.S. PATENT DOCUMENTS

| | | |
|---|---|---|
| 2009/0224500 A1 | 9/2009 | Raschke et al. |
| 2010/0138005 A1 | 6/2010 | Bancalari |
| 2010/0285892 A1 | 11/2010 | Hoeks et al. |
| 2016/0084305 A1 | 3/2016 | Fujita |

FOREIGN PATENT DOCUMENTS

| | | |
|---|---|---|
| CN | 204419897 U | 6/2015 |
| CN | 105546033 A | 5/2016 |
| CN | 106286700 A | 1/2017 |
| CN | 108050337 A | 5/2018 |
| DE | 4335766 A1 | 4/1995 |
| DE | 19856500 B4 | 12/2005 |
| DE | 102008006782 B3 | 4/2009 |
| DE | 202014004620 U1 | 7/2014 |
| EP | 2372152 A1 | 10/2011 |
| WO | WO 2008028830 A1 | 3/2008 |

\* cited by examiner

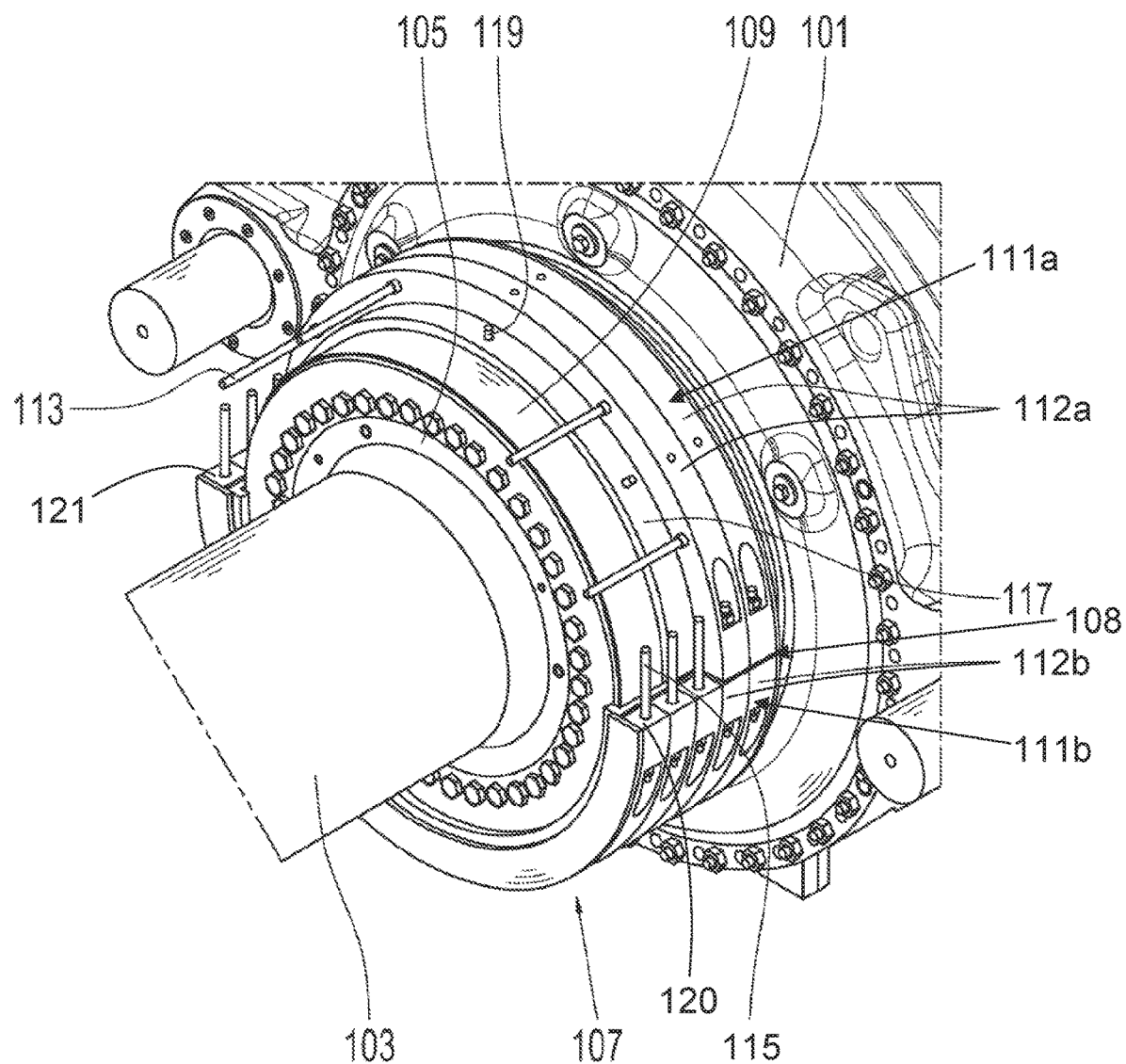

TORSION ABSORBER FOR WIND TURBINES

CROSS-REFERENCE TO PRIOR APPLICATIONS

This application is a U.S. National Phase Application under 35 U.S.C. § 371 of International Application No. PCT/EP2019/077020, filed on Oct. 7, 2019, and claims benefit to German Patent Application No. DE 10 2018 218 812.2, filed on Nov. 5, 2018. The International Application was published in German on May 14, 2020 as WO 2020/094308 under PCT Article 21(2).

FIELD

The invention relates to a torsion absorber for attachment to a cylindrical section of a shaft.

BACKGROUND

Torsional vibrations occurring in the drive train of a wind turbine are problematic, since they are accompanied by an increased load on the components and cause noise emissions. The problem of torsional vibrations occurring can be mitigated by targeted constructive influencing of the natural frequencies. However, the oscillation properties of all components interacting in the drive train would have to be precisely known for this purpose. In practice, this is often not the case.

Torsion absorbers with a one-piece flywheel and a mounting flange are known from the prior art. The mounting flange serves to fasten the torsion absorber to a shaft. The flywheel is rotatably with respect to the mounting flange and is resiliently connected thereto. Torsional vibrations of the shaft are eliminated or mitigated by counter vibrations of the flywheel.

If a torsion absorber is to be used, this must already be taken into account when designing the shaft. Due to the construction of the torsion absorber with one-piece flywheel and mounting flange, it is not possible to retrofit a shaft with the torsion absorber.

The publication DE 198 56 500 B4 discloses a vibration absorber for a wind turbine. The vibration absorber is suspended in the tower of the wind turbine and mitigates translatory vibrations of the engine nacelle. Rotational vibrations of the drive train remain unaffected.

SUMMARY

In an embodiment, the present invention provides a torsion absorber for attachment to a cylindrical section of a shaft. The torsion absorber includes a flywheel and at least one tensioner. The at least one tensioner is configured to brace a first segment and a second segment of the flywheel against the cylindrical section of the shaft.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

The FIGURE shows a torsion absorber.

DETAILED DESCRIPTION

In an embodiment, the present disclosure provides an improved drive train, in particular a drive train of a wind turbine, in comparison with the solutions known from the prior art. This is intended to increase the durability of the components of the drive train and to reduce the noise emissions thereof. It should be possible to retrofit existing plants for this purpose.

The present disclosure provides an improved drive train via a torsion absorber, also referred to as torsional vibration damper.

The torsion absorber is configured to be fixed to a cylindrical section of a shaft. The cylindrical section has a surface corresponding to the lateral surface of a right circular cylinder. The cylindrical section can be, for example, a shrink disc that connects a first part of the shaft to a second part of the shaft in a rotationally fixed manner.

A shrink disc is characterized in that it is applied from the exterior to the first part of the shaft and the second part of the shaft, and its inner diameter can be reduced by a tension mechanism. This creates an interference fit between the shrink disc and the first part of the shaft and between the shrink disc and the second part of the shaft, and consequently a frictional connection. The frictional connection serves to transmit torques between the first part of the shaft and the second part of the shaft.

The torsion absorber has a secondary mass, here called a flywheel. The flywheel is rotatable relative to the shaft by a small angle. In particular, the angle of rotatability of the flywheel relative to the shaft is less than 360 degrees. The flywheel is resiliently coupled to the shaft. It is excited to counter-vibrations by torsional vibrations of the shaft. These have a mitigating effect on the torsional vibrations of the shaft.

According to the present disclosure, the torsion absorber has at least one tensioning means. The tensioning means is preferably a screw. The tensioning means causes a tensioning of the first segment and the second segment against the cylindrical section. This implies that the first segment and the second segment form separate pieces that are, in particular, not integrally connected to each other.

By tensioning the first segment and the second segment against the cylindrical section, the flywheel exerts normal forces and/or a pressure in the radial direction on the cylindrical section. Consequently, a frictional connection is established between the flywheel and the cylindrical section, which fixes the flywheel to the cylindrical section.

Due to the at least two-piece design of the flywheel, the torsion absorber according to the invention can be attached to any shaft that has a cylindrical section. Adaptations of the construction are not required. In particular, it is possible to retrofit an already existing shaft with the torsion absorber.

In a preferred development, the tensioning means is braced between the first segment and the second segment. This implies that the first segment and the second segment are braced against one another by the tensioning means. As a result of the tensioning, the tensioning means exerts forces on the first segment and on the second segment, which are directed towards one another. The tensioning means thus exerts a force on an engagement point in the first segment, which is directed at an engagement point of the tensioning means in the second segment. Conversely, the tensioning means exerts a force on the engagement point of the second segment, which acts in the direction of the engagement point of the first segment. Both forces are equal in magnitude and have a different algebraic sign.

In a further preferred development, the tensioning means exerts a tensioning force extending tangentially with respect to the cylindrical section on the first segment and the second segment. In particular, the tensioning force thus runs orthogonally to a central axis or axis of symmetry of the cylindrical section. This axis is identical to an axis of rotation of the shaft.

The tensioning force exerted by the tensioning means on the first segment denotes the above-mentioned force acting on the first segment in the engagement point of the tensioning means. Accordingly, the tensioning force exerted on the second segment by the tensioning means is the above-mentioned force acting on the second segment in the engagement point of the tensioning means. According to the development, both forces therefore extend tangentially with respect to the cylindrical section.

In order to enable the relative mobility of the flywheel with respect to the shaft, in a preferred development, an elastic insert is provided which is arranged between the flywheel and the cylindrical section. The elastic insert fills a radial gap extending between the flywheel and the cylindrical section of the shaft. The tensioning of the first segment and the second segment against the cylindrical section is then designed such that the first segment and the second segment are braced against the elastic insert, which in turn is braced against the cylindrical section of the shaft.

The elastic insert acts as a spring element which is tensioned by a rotation of the flywheel relative to the shaft and applies a spring force acting between the flywheel and the shaft. The spring force is accompanied by a torque which counteracts the rotation of the flywheel relative to the shaft.

An elastic insert is to be understood as an insert which has the described spring effect. This is preferably achieved by an elastic modulus and/or shear modulus of the insert, which is less than an elastic modulus and/or shear modulus of the cylindrical section of the shaft and of the flywheel. The insert can thus consist of, for example, an elastomer.

Like the flywheel, the insert is preferably a multi-piece design in order to be able to retrofit the torsion absorber.

The flywheel is preferably further formed with an intermediate piece located between the insert and the flywheel, said intermediate piece filling a radial gap between the insert and the flywheel. The intermediate piece serves to adapt the torsion absorber to different diameters of the cylindrical section. A single flywheel can thus be used for a plurality of diameters of the cylindrical section. Like the elastic insert, the intermediate piece is also a multi-piece design with a view to the retrofittability.

In a preferred development, the flywheel has a hollow-cylindrical basic shape. The basic shape of a body denotes the shape of an original body from which the first-mentioned body is formed by eliminating individual regions, for example by inserting recesses and/or by adding individual regions.

Preferably, the torsion absorber is further formed with a first and second segment that are identical in construction. Two components are identical in construction if they correspond in their physical parameters—in particular with regard to their material and geometry properties—within the scope of the manufacturing tolerances which occur.

The identically designed first and second segments may be arranged rotated relative to on another, in particular by an angle of 180 degrees about the center axis of the cylindrical section.

In a preferred development, a separating joint between the first segment and the second segment extends both radially and axially. This means that the separating joint and the axis of rotation of the shaft extend in a common plane.

In addition, in a preferred embodiment, a second separating joint between the first segment and the second segment also extends both radially and axially, that is with the axis of rotation of the shaft in a common plane. In particular, the first separating joint, the second separating joint and the rotational axis of the shaft may extend in a common plane.

The first separating joint and/or the second separating joint are preferably bridged by a tensioning means of the type described above. This means that the tensioning means extends through the respective separating joint. A longitudinal axis of the tensioning means is orthogonal to the above-mentioned plane, which contains the separating joint and the axis of rotation of the shaft. In particular, the forces applied by the tensioning means are orthogonal to this plane.

Preferably, the first segment and the second segment are each formed in a multi-piece design. The first segment and the second segment thus each comprise a first partial segment and a second partial segment. The partial segments are separate pieces which are not integrally connected to one another.

A first tensioning means of the type described above braces the first partial segment of the first segment and the first partial segment of the second partial segment against the cylindrical section. Accordingly, a second tensioning means braces the second partial segment of the first segment and the second partial segment of the second segment against the cylindrical section.

The manageability is improved by the multi-piece construction of the first segment and the second segment. This is advantageous in particular in wind turbines, as space in the nacelle is very limited and the individual parts to be mounted have to be lifted to considerable height by means of a crane.

In a preferred development, the first partial segment and the second partial segment of the first segment are identical in construction to the first partial segment and the second partial segment of the second segment. In particular, all partial segments can be identical in construction.

Preferably, the first partial segment and the second partial segment of the first segment as well as the first partial segment and the second partial segment of the second segment are arranged at an axial offset relative to one another, that is in the direction of or parallel to the axis of rotation of the shaft.

In a preferred development, a separating joint extends radially and in the circumferential direction between the first partial segment and the second partial segment of the first segment and between the first partial segment and the second partial segment of the second segment. The separating joints thus each extend in a radially oriented plane, that is to say orthogonal to the axis of rotation of the shaft.

The torsion absorber is preferably part of an arrangement for a drive train of a wind turbine. In addition to the torsion absorber, the arrangement comprises a rotor shaft, a transmission and a shrink disc. A rotor of the wind turbine is mounted on the rotor shaft. The rotor shaft thus carries the rotor. In particular, there is a rotationally fixed connection between the rotor and the rotor shaft. The rotor shaft is connected in a rotationally fixed manner to an input shaft of the transmission by means of the shrink disc. The rotor shaft and the input shaft together form the above-mentioned shaft. The rotor shaft represents the first part of the shaft, and the input shaft represents the second part. The shrink disc forms a cylindrical section on which the torsion absorber is mounted.

A FIG. 1 shows a transmission 101 of a wind turbine. The drive is effected via a rotor shaft 103. A rotatably mounted planet carrier of the transmission 101, which forms an input shaft, is connected to the rotor shaft 103 in a rotationally fixed manner by means of a shrink disc 105. The shrink disc 105 exerts a radially directed pressure on the rotor shaft 103 and on the input shaft, so that a rotationally fixed connection between the rotor shaft 103 and the input shaft is established by frictional connection.

An exterior part of the surface of the shrink disc 105 has the shape of a lateral surface of a right circular cylinder. This part of the surface serves to receive a torsion absorber 107. The torsion absorber 107 consists of an elastomer layer 109, a first segment 111a and a second segment 111b forming a flywheel 108, fixing screws 113, tensioning screws 115 and intermediate pieces 117. The segments 111a, 111b are self-contained and completely surround the shrink disc in the circumferential direction. Each segment 111a, 111b consists of a plurality of partial segments 112a, 112b.

Intermediate pieces 117 are located between the first segment 111a and the damping layer 109 as well as between the second segment 111b and the damping layer 109. The intermediate pieces 117 and the damping layer 109 are adapted to the dimensions of the shrink disc 105. It is not necessary to adapt the segments 111a, 111b. The same segments 111a, 111b can therefore be used for shrink discs 105 of different dimensions.

In each case, a partial segment 112a of the first segment 111a and a partial segment 112b of the second segment 111b are braced against one another by means of two tensioning screws 115 at a first separating joint 120 and second separating joint 121. The force of the tensioning produces a normal force acting on the intermediate pieces 117 in the radial direction. This results in a frictional connection between the intermediate pieces 117 and the damping layer 109.

The fixing screws 113 extend axially through the individual partial segments and fix them to one another. A positive-fit connection is established between the intermediate pieces 117 and the segments 111a, 111b by pins 119. The pins 119 are formed by the intermediate pieces 117 and engage in corresponding bores of the segments 111a, 111b.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

101 Transmission
103 Rotor shaft
105 Shrink disk
107 Torsion absorber
109 Elastomer layer
111a First segment
111b Second segment
113 Fixing screw
115 Tensioning screw
117 Intermediate piece
119 Pins

The invention claimed is:

1. A torsion absorber for attachment to a cylindrical section of a shaft, the torsion absorber comprising:
a flywheel having a first segment and a second segment;
at least one tensioner;
an elastic insert between the flywheel and the cylindrical section; and
an intermediate piece arranged between the flywheel and the elastic insert,
wherein the at least one tensioner is configured to brace the first segment and the second segment of the flywheel against the cylindrical section, and
wherein the intermediate piece is arranged between the first segment and the elastic insert and/or between the second segment and the elastic insert.

2. The torsion absorber according to claim 1; wherein the tensioner is braced between the first segment and the second segment.

3. The torsion absorber according to claim 1, wherein the tensioner exerts a tensioning force extending tangentially with respect to the cylindrical section on the first segment and the second segment.

4. The torsion absorber according to claim 1, wherein the flywheel has a hollow-cylindrical basic shape.

5. The torsion absorber according to claim 1, wherein the first segment and the second segment are identical in construction.

6. The torsion absorber according to claim 5, wherein the first segment and the second segment are arranged rotated by an angle of 180 degrees with respect to one another about a central axis of the cylindrical section.

7. The torsion absorber according to claim 1, further comprising a first, radially and axially extending separating joint between the first segment and the second segment.

8. The torsion absorber according to claim 7, further comprising a second, radially and axially extending separation joint between the first segment and the second segment.

9. An arrangement for a drive train of a wind turbine; the arrangement comprising:
a transmission;
a rotor shaft;

a shrink disc; and a torsion absorber according to claim 1 mounted on the shrink disc, wherein the rotor shaft is connected to an input shaft of the transmission in a rotationally fixed manner by the shrink disc.

10. The torsion absorber according to claim 1, wherein the intermediate piece includes a plurality of radially protruding pins, wherein the first segment and the second segment include radially extending bores, and wherein the plurality of pins are configured to protrude into the bores of the first segment and the second segment.

11. A torsion absorber for attachment to a cylindrical section of a shaft, the torsion absorber comprising:

a flywheel having a first segment and a second segment; and at least one tensioner, wherein the at least one tensioner is configured to brace the first segment and the second segment of the flywheel against the cylindrical section, wherein the first segment and the second segment each comprise a first partial segment and a second partial segment;

wherein the at least one tensioner includes a first tensioner and a second tensioner, wherein the first tensioner is configured to brace the first partial segment of the first segment and the first partial segment of the second segment against the cylindrical section; and wherein the second tensioner is configured to brace the second partial segment of the first segment and the second partial segment of the second segment against the cylindrical section.

12. The torsion absorber according to claim 11, wherein the first partial segment and the second partial segment of the first segment are identical in construction, and wherein the first partial segment and the second partial segment of the second segment are identical in construction.

13. The torsion absorber according to claim 12, wherein the first partial segment and the second partial segment of the first segment are arranged axially offset from one another, and wherein the first partial segment and the second partial segment of the second segment are arranged axially offset from one another.

14. The torsion absorber according to claim 11, further comprising:

a first separating joint extending radially and in the circumferential direction between the first partial segment and the second partial segment of the first segment; and a second separating joint extending radially and in the circumferential direction between the first partial segment and the second partial segment of the second segment.

15. The torsion absorber according to claim 11, further comprising a plurality of axially extending fixing screws, wherein the first partial segment and the second partial segment of the first segment are configured to be fixed to one another by at least one of the plurality of axially extending fixing screws, and wherein the first partial segment and the second partial segment of the second segment are configured to be fixed to one another by at least one of the plurality of axially extending fixing screws.

* * * * *